United States Patent [19]

Chiu et al.

[11] Patent Number: 5,018,300
[45] Date of Patent: May 28, 1991

[54] HANGING BASKET LINER

[76] Inventors: Martin T. Chiu, 3155 Arlotte Ave.; Derek A. Firth, 3461, Val Verde Ave., both of Long Beach, Calif. 90808

[21] Appl. No.: 425,124

[22] Filed: Oct. 23, 1989

[51] Int. Cl.[5] ............... A01G 9/02; A47G 7/00
[52] U.S. Cl. ............................ 47/67; 47/78; 47/72
[58] Field of Search .............. 47/66, 67, 72, 78

[56] References Cited

U.S. PATENT DOCUMENTS

| 1,624,504 | 4/1927 | Pfarr | 47/67 |
| 3,818,633 | 6/1974 | Sable | 47/67 |

FOREIGN PATENT DOCUMENTS

| 161005 | 4/1933 | Switzerland | 47/72 |

Primary Examiner—David A. Scherbel
Assistant Examiner—Jerrold D. Johnson
Attorney, Agent, or Firm—Plante, Strauss VanderBurgh & Connors

[57] ABSTRACT

Disclosed is a hanging basket liner for lining wire and other types of hanging baskets designed to hold live, growing plants and flowers or artificial plants or flowers. The liner is of a construction which incorporates a covering of sphagnum moss on its outer surface, so that it has a natural appearance. The flexible material from which the inner liner is made is adaptable, by cutting and trimming, to fit various sizes and shapes of hanging baskets. The liner, which has a diameter in the range from 17 inches to 48 inches and a thickness in the range from ¼ to ½ inch, has a inner lining with sponge like properties which retains moisture, reduces the drying out of the growing medium and is durable, long lasting and reuseable. The liner has a number of vanes emanating from its center so that side slits, through which trailing plants can grow, are created as the liner conforms to the shape of the hanging basket.

9 Claims, 8 Drawing Sheets

HANGING BASKET LINER

BACKGROUND OF THE INVENTION

1. Field of the Invention

This invention relates to a liner for hanging baskets, and particularly, a liner for wire hanging baskets designed to hold soil and live plants and flowers.

2. Background Discussion

Most of the homes in the western world have gardens, patios, atriums, porchways or overhangs where the occupants seek to cultivate live plants and flowers to enhance the beauty and appearance of the home. In addition, many business premises and public open-air places have landscaping and planters as an integral part of their planning or architecture.

In order to create attractive garden scenes and views in public or private places, detailed planning and design has to be followed by preparation and installation, which, due to the lack of automated methods, is very labor intensive. The hanging basket is an excellent means of displaying one's horticultural creativity and can be utilized even where there is no ground level planting area available. It can be displayed in a multitude of places and, when the traditional wire basket is used, maximum use can be made of the plant growing area, by using the top, bottom and sides of the basket.

Unfortunately the preparation, filling and planting of wire baskets is one of the most time consuming and labor intensive of gardening activities. This is a deterrent to many people and thus the making up of wire baskets has been mainly done by professionals or enthusiastic amateurs.

The most commonly used medium for lining wire hanging baskets is sphagnum moss which, although it gives a very pleasing, natural and aesthetic look to the finished hanging basket, is very tedious with which to work. The sphagnum moss method entails taking the dried moss, which is brittle and crumbly, and soaking it in water to make it sufficiently pliable to mold it around the interior of the basket. This is time consuming and requires skill and experience to produce a consistent and functional lining. There are several problems with the moss method. These include the level of skill required to create an effective lining and to avoid using too much moss and thus causing unnecessary waste. The moss dries out very quickly and allows moisture and water to escape and thus the plants in the basket require water replenishment very frequently.

There are two other types of liners available for wire hanging baskets. These are, firstly, a molded liner made from compressed fiber board and, secondly a flexible matting liner made from coconut fiber. Both of these two products are simpler and easier to work with than sphagnum moss but do not provide the natural appearance. There are further disadvantages to these liners, both of which are designed primarily to fit only one size of basket. The fiber board liner is of rigid construction, which gives it strength but does not allow it to be molded to the shape of the basket. It also does not facilitate the growing of plants from the side and base. The coconut matting liner can be molded to the shape of the basket, but it frays very easily when it is cut or trimmed to fit varying basket shapes and sizes. It also has poor moisture retaining properties, thus allowing excessive water drainage, as is the case with the sphagnum moss liner.

The objective of the invention is to provide a liner for wire hanging baskets which overcomes the problems of the other methods of lining and at the same time produce a natural and aesthetic appearance to the completed basket. As the invention is also simple to work with and requires minimal skill and experience it will allow a greater number of gardeners to produce their own hanging baskets.

PRINCIPAL FEATURES OF THE INVENTION

In accordance with this invention, there is provided a liner for wire hanging baskets which will permit easy preparation of the baskets, encourage healthy growth of the plants, minimize maintenance and have a natural appearance. The advantages of the liner of this invention are that it is flexible to work with, can fit different sizes and shapes of basket and because of its natural looks, blend in with the plants in the hanging basket. One of the characteristics of the liner is that it can be easily cut and trimmed to fit the varying shapes and sizes of wire baskets. This means that it can be used and worked much quicker and easier than other methods. An additional feature of this invention is that it has an inner lining constructed of flexible sponge material which has three basic functions. One, its flexible structure permits the easy adaptation to varying basket shapes. Two, the sponge like properties help retain moisture without waterlogging the plant's roots. Three, the inner lining acts as a barrier which assists in reducing the drying out of the soil, caused by breezes and winds, which is a common problem with the sphagnum moss method. The thickness of the inner liner of the invention is approximately 5/16 of an inch and thus it does not restrict the space in the wire basket for the soil growing medium. Another characterizing feature of this invention is the outer surface of the liner, which is covered by a thin layer of sphagnum moss applied to the outer surface by the means of an adhesive. This provides a durable and natural appearance for the invention. An additional feature of the liner of this invention is the construction of the inner lining, which is of circular shape and has a number of vanes extending from the center body. This construction permits the liner to become concave and assume the shape of the wire basket. The slits thus formed in the side of the invention permit one to place plants in the walls of the hanging wire basket and thus have plants growing from the sides of the hanging basket in addition to the top.

DETAILED DESCRIPTION OF THE DRAWINGS

Figure 1:
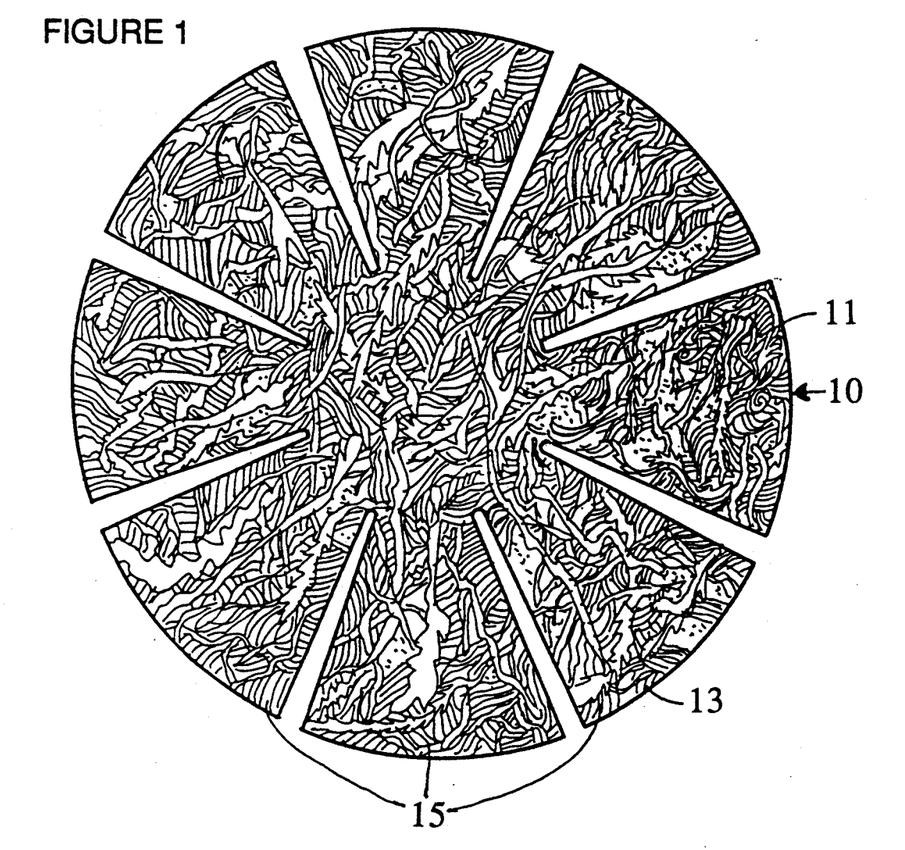
FIG. 1 is a plan view of one embodiment of the present invention.
Figure 2:
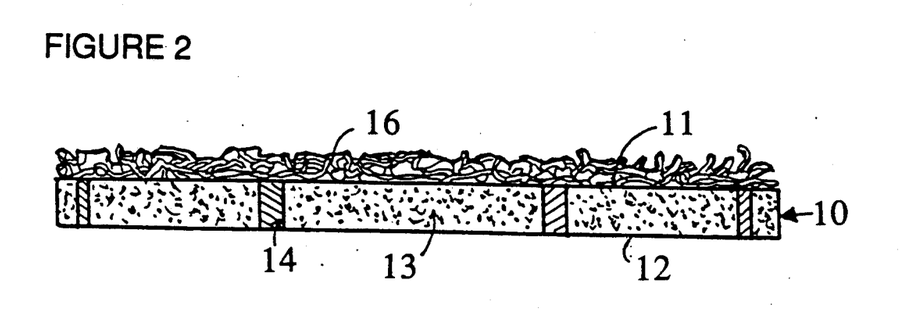
FIG. 2 is a side elevational view of the hanging basket liner shown in FIG. 1.
Figure 3:
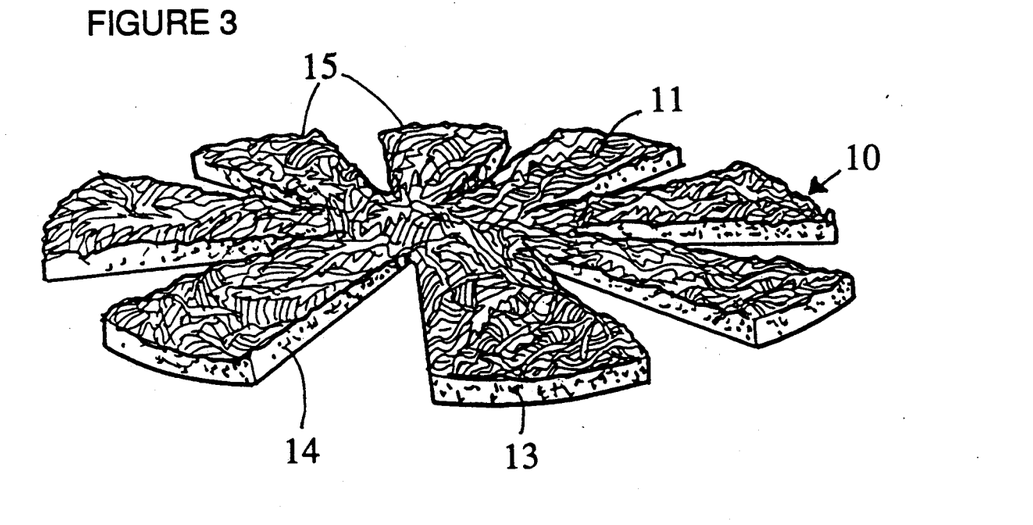
FIG. 3 is a perspective view of the liner which has an inner liner made from a flexible sponge material, the outer surface of which is covered by a layer of sphagnum moss.

Referring to FIGS. 1 through 3, there is depicted one embodiment of the hanging basket liner 10 of this invention. This liner 10 is of a generally circular configuration, with an outer surface 11, inner surface 12, an outer edge surface 13 and interior surfaces 14 of the vanes 15. The outer surface 11 is covered by a layer of sphagnum moss 16 attached to the surface by means of adhesive. The liner itself is made of a flexible, synthetic sponge like material such as polyether or polyester foam with an open or partially closed cell structure.

In accordance with one of the features of this invention, the diameter of the hanging basket liner 10, in the open position illustrated in FIGS. 1 through 3, is 24" (twenty-four inches) and thus in the closed position would be able to fit in to all round wire baskets up to the 16" shallow type. Thus the liner of this invention is adaptable to fit all of the most commonly used wire hanging baskets.

Figure 4:
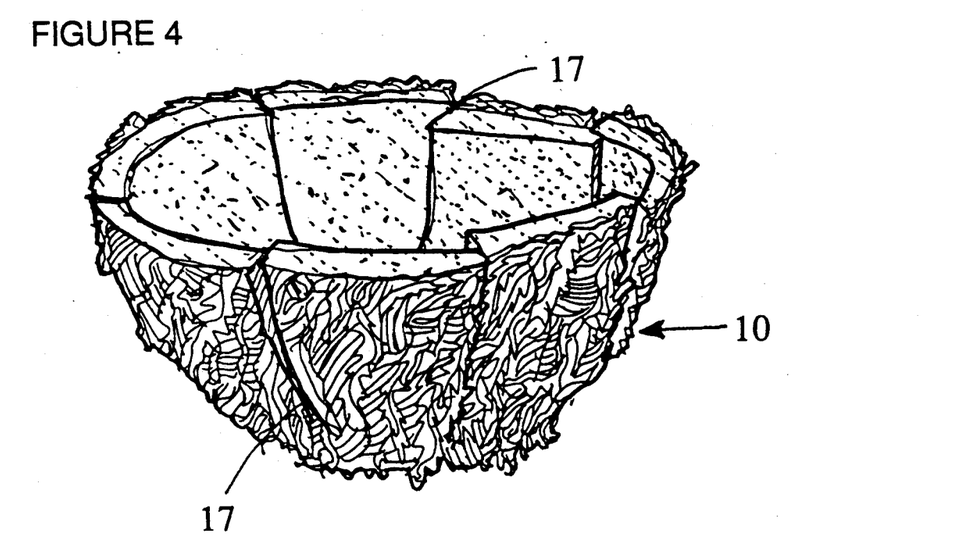
FIG. 4 is a perspective view of the liner, in the shape it will take as it is placed in the wire hanging basket.

Referring to FIGS. 3 and 4, the invention is shown in the open position, FIG. 3, and in the closed position, FIG. 4. It can be seen that the vanes 15, are cut at precise angles so as to permit the forming of a dish shape when in the closed position. The space between the vanes in FIG. 3, form the side slits 17, when in the closed position in FIG. 4.

Figure 5:
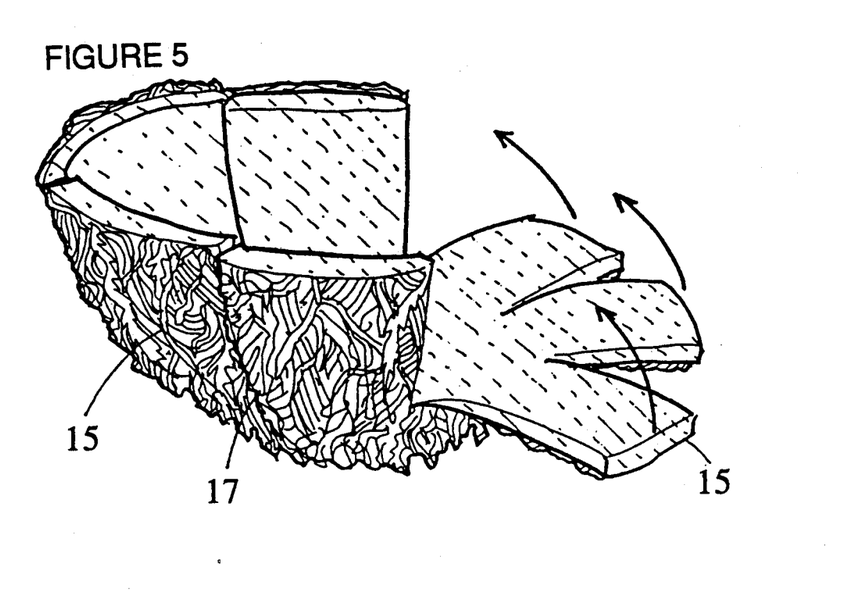
FIG. 5 is a perspective view of the vanes of the liner in the open and closed position, which they assume in the basket.
Figure 6:
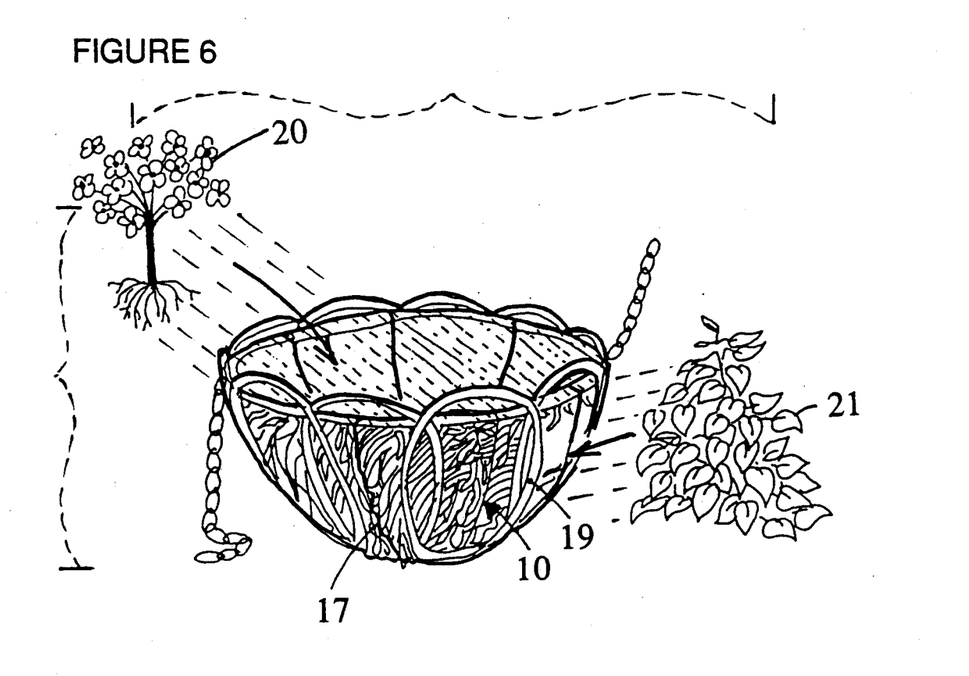
FIG. 6 is a perspective view of the liner inside the basket prior to the filling with growing medium and placing of the plants.

One of the important features of this invention is the flexibility of the liner and the ease with which it can be changed from the flat open position to the closed dish shaped position as depicted in FIG. 5. Here the forming of the side slits 17 from the closing of the vanes 15 is shown. FIG. 6 depicts the liner of this invention inside a wire basket 19 and illustrates how the vertical growing plants 20 would be placed in the invention inside the wire basket 19 and further, how the trailing plants 21, would be placed through the side slits 17.

Figure 7:
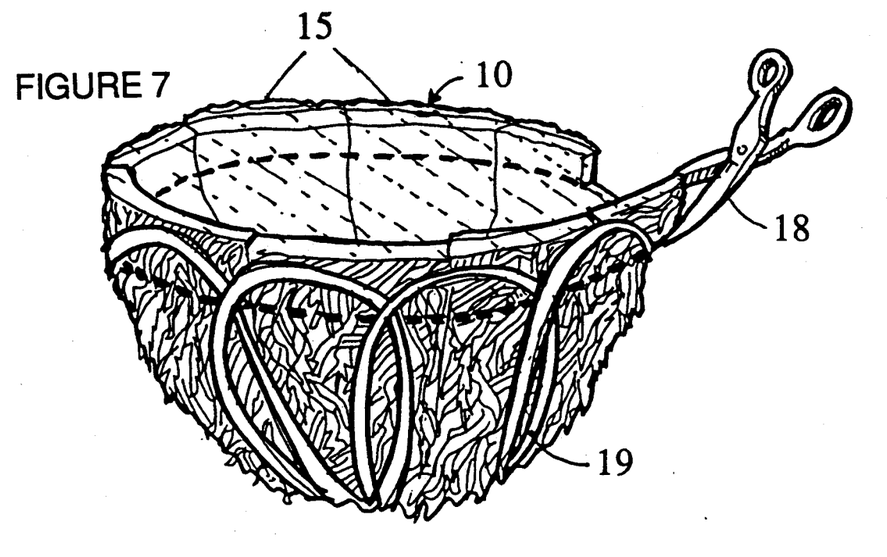
FIG. 7 is a perspective view showing the method by which the invention can be modified in size to fit varying sizes and shapes of wire basket.
Figure 7A:
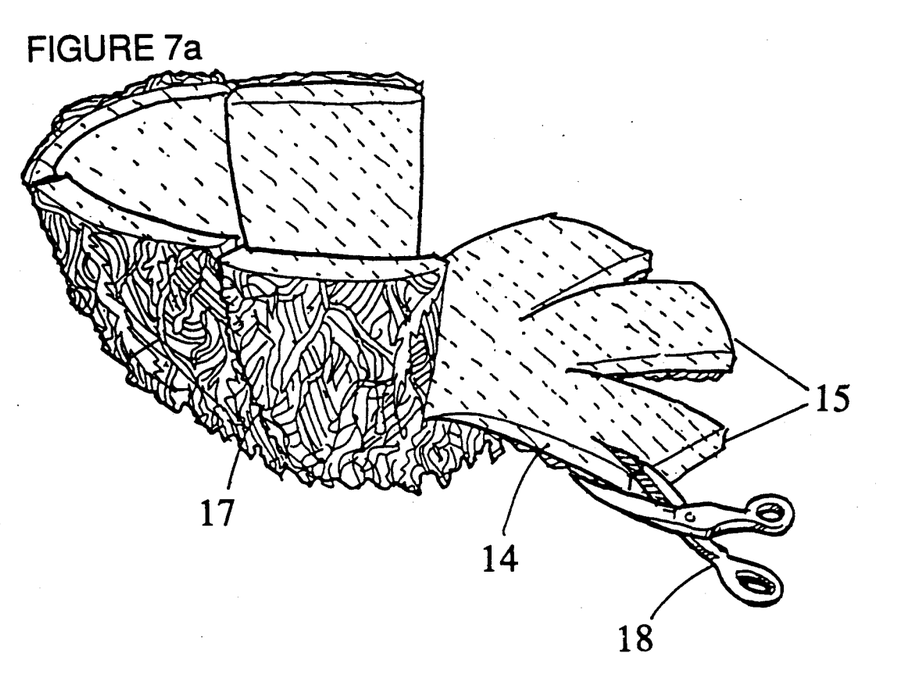
Figure 11:
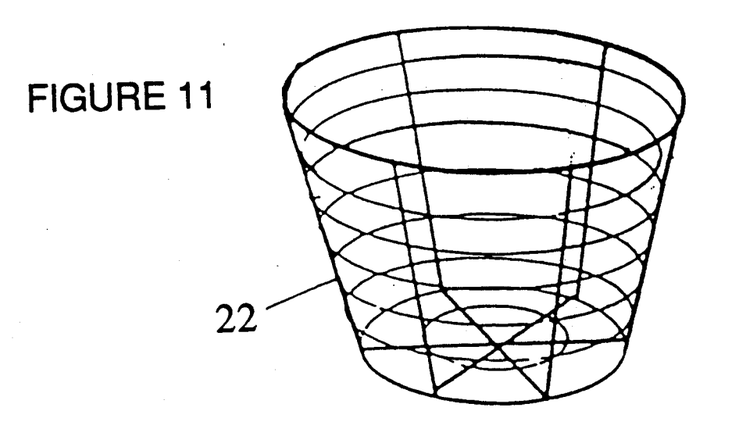
FIG. 11 illustrates the round, deep style of wire hanging basket.

Referring to FIG. 7 the liner 10, is shown in the position inside the wire hanging basket 19, and illustrates the ease of the method of trimming the liner 10, to fit the size of the basket 19, by the use of shears or scissors 18. The synthetic sponge like material of which the liner 10 is made also permits, as shown in FIG. 7a, the trimming, by cutting with shears or scissors 18 the interior surfaces 14 of the vanes 15, thus the liner of this invention can easily be made to fit hanging wire baskets of the deeper type as illustrated in FIG. 11.

Figure 8:
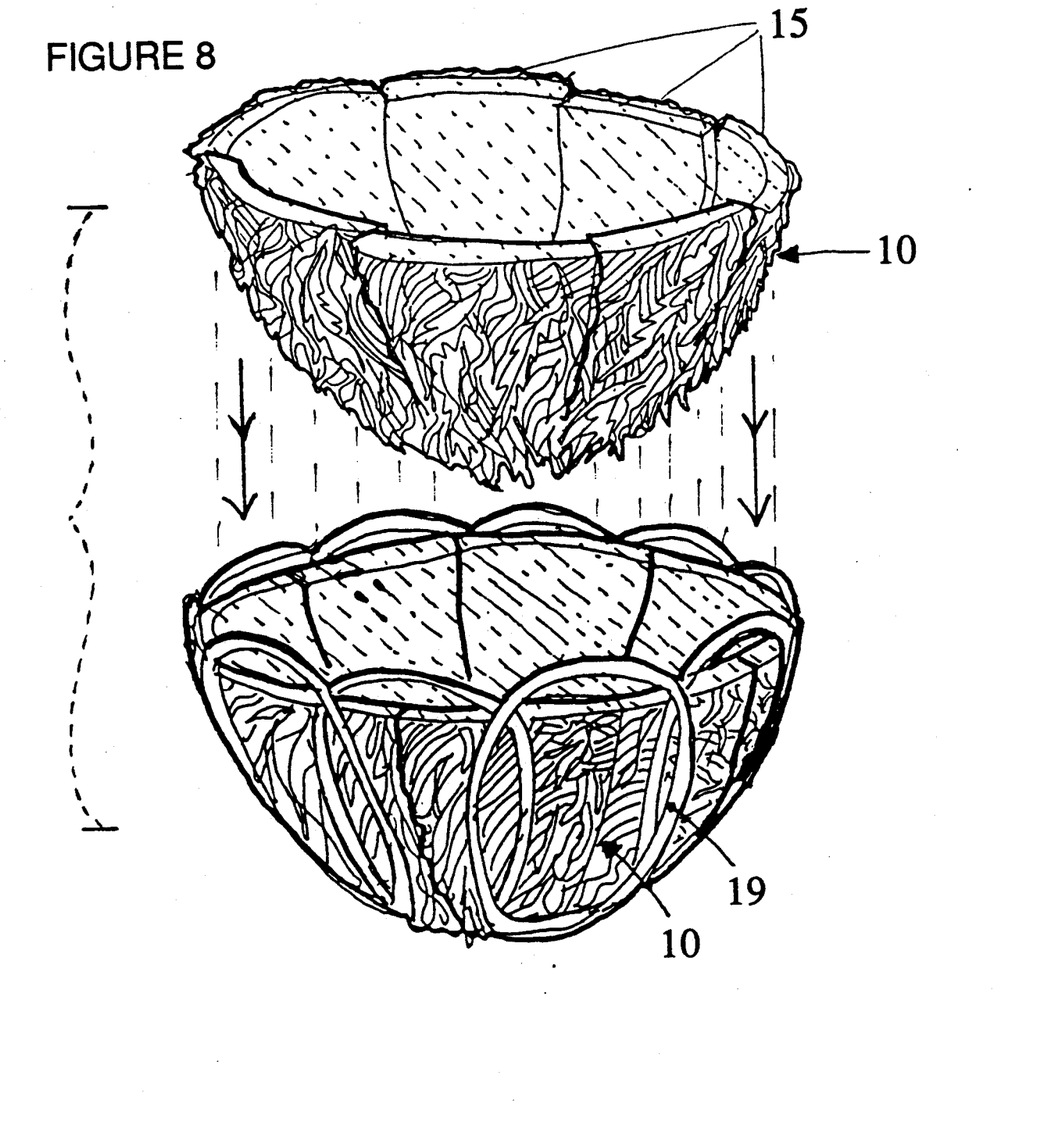
FIG. 8 is a perspective view of the present invention in the shape it takes as it is placed inside the hanging wire basket.

FIG. 8 depicts the hanging basket liner 10 in the closed position and illustrates how, with the closing of the vanes 15, the liner becomes dish shaped and fits into the wire hanging basket 19.

Figure 9:
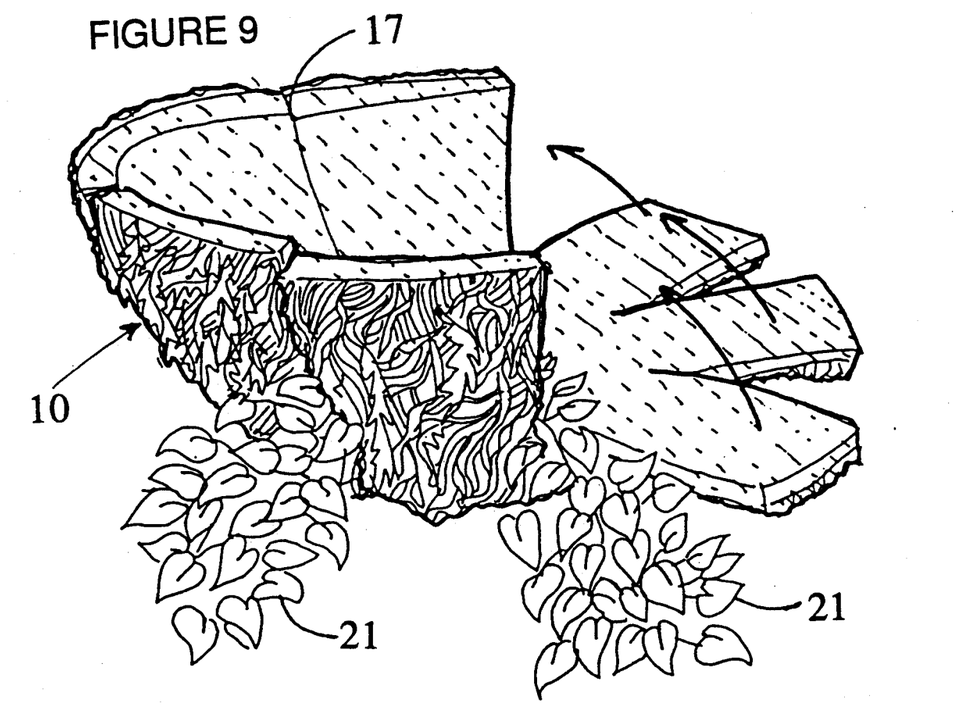
FIG. 9 is a perspective view of the invention showing the vanes open and closed and plants trailing through the side slits.

Referring to FIG. 9 there is illustrated the method by which trailing plants 21 can be inserted through the slits 17 in the side of the liner 10. This would be done at the time of planting the hanging basket, immediately before adding the growing medium, soil, (not shown).

Figure 10:
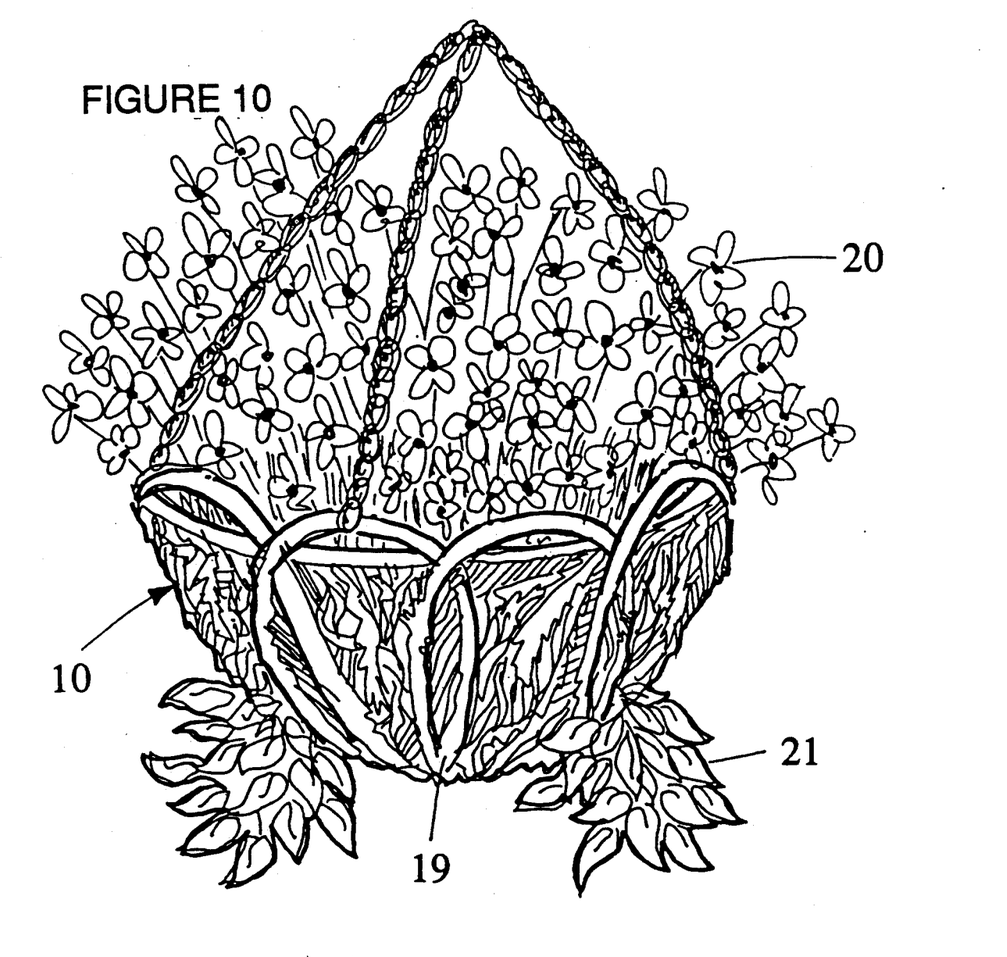
FIG. 10 is a perspective view of the liner inside the hanging wire basket after adding the growing medium and plants.

As shown in FIG. 10, the hanging basket liner of this invention 10, blends naturally into the wire basket 19 and, after planting with the vertical growing plants 20 and the trailing plants 21, now starts to function as a protector of the growing medium from erosion and drying out. The sponge like material from which the liner is made retains water during the process of watering the hanging basket and thus helps extend the intervals between adding water, necessary for the prolonged life of the plants.

Figure 12:
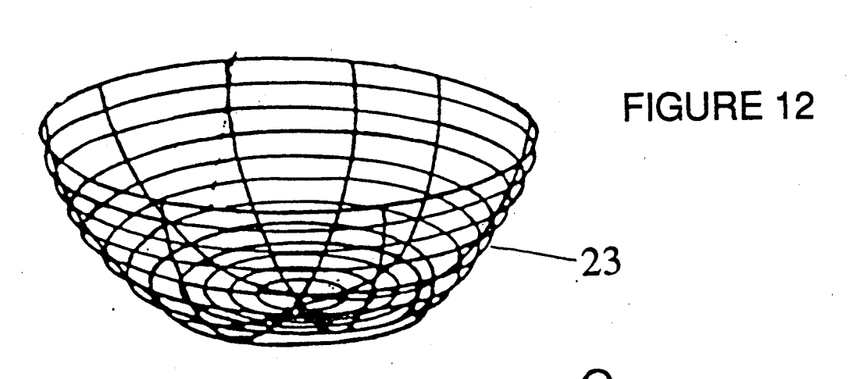
FIG. 12 illustrates the round, shallow style of wire hanging basket.
Figure 13:
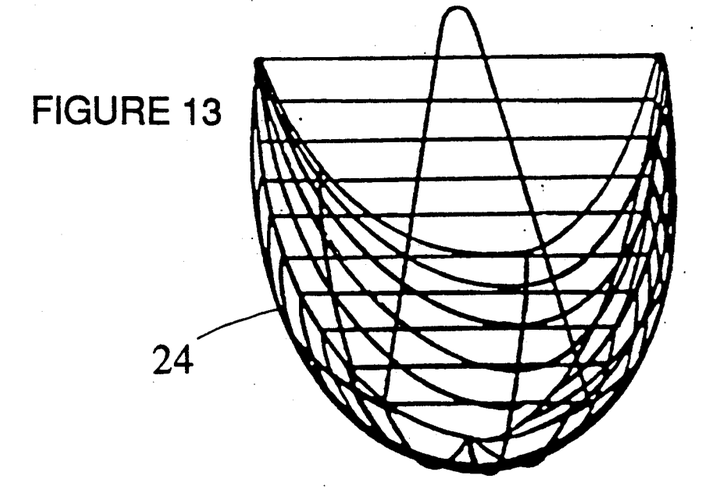
FIG. 13 illustrates the 'D'-shaped wall mount wire basket.

Referring to FIGS. 11 through 13, some of the most widely utilized styles of wire hanging baskets are depicted. The round, deep style basket 22 is used for transplanting mature plants with large root systems. The larger floral displays are often planted in the round, shallow style 23. The wire basket shown in FIG. 13 is the 'D'-shaped wall mount style 24 and the hanging basket liner of this invention will fit this and the other shapes and sizes of wire hanging basket.

SCOPE OF THE INVENTION

The above description presents the best mode contemplated of carrying out the present invention as depicted by the embodiments disclosed. The features illustrated by these embodiments provide the advantages of this invention. This invention is, however, susceptible to modifications and alternate constructions from the embodiments shown in the drawings and described above. Consequently, it is not intended to limit it to the particular embodiments disclosed. On the contrary, the intention is to cover all modifications and alternates falling within the scope of the invention as generally expressed by the following claims:

We claim:

1. A hanging basket liner comprising:
   an inner lining which is of a generally circular configuration having top, inner and outer surfaces, said lining having a diameter within the range of from about 17 inches to 48 inches and being flexible in construction and with vanes emanating from a smaller inner circle, said inner circle having a diameter within the range of from about 10 inches to 24 inches, and said inner lining having a thickness within the range of from $\frac{1}{4}$ to $\frac{1}{2}$ inch and having on said outer surface a covering of sphagnum moss or similar material, the liner, complete with its outer covering being so constructed as to form a dish shape when adapted to the shape of the interior of a wire hanging basket designed to hold live or artificial plants and flowers.

2. The liner of claim 1 whereon the outer surface covering is a synthetic material simulating sphagnum moss.

3. The liner of claim 1 wherein the inner lining is made of rebonded flexible polyurethane foam.

4. The liner of claim 1 wherein the inner lining is made of a partially closed cell structure flexible polyurethane foam with enhanced sponge like properties thus retaining water.

5. The liner of claim 1 wherein the inner lining is made of a partially closed cell structure flexible polyester foam with a high saturation level of sponge properties, but still allowing the growing medium to breath whilst retaining water.

6. The liner of claim 1 constructed with more than eight vanes.

7. The liner of claim 1 constructed with less than eight vanes.

8. A hanging basket liner comprising:

an inner lining which is generally semi-circular in configuration, or such other configuration as would take the shape of a hanging wire basket with an open top or base which is of a configuration other than circular, said lining having its smallest linear dimension within the range of from 8 inches to 20 inches and its largest linear dimension within the range of from 17 inches to 48 inches and being flexible in construction and having a number of vanes emanating from its center, and said inner lining having a thickness within the range of from $\frac{1}{4}$ to $\frac{1}{2}$ inch and having top, inner and outer surfaces and having on said outer surface a covering of sphagnum moss or similar material.

9. The liner of claim 8 wherein the inner lining is made of a closed or partially closed cell polyester or polyurethane flexible foam or other material with enhanced sponge like properties for retaining moisture and water.

* * * * *